United States Patent
Jones

(10) Patent No.: US 9,126,663 B2
(45) Date of Patent: Sep. 8, 2015

(54) AQUATIC EQUIPMENT-MOUNTING HEADGEAR

(71) Applicant: Russell Jones, Los Angeles, CA (US)

(72) Inventor: Russell Jones, Los Angeles, CA (US)

( * ) Notice: Subject to any disclaimer, the term of this patent is extended or adjusted under 35 U.S.C. 154(b) by 0 days.

(21) Appl. No.: 14/070,500

(22) Filed: Nov. 2, 2013

(65) Prior Publication Data
US 2015/0122849 A1 May 7, 2015

(51) Int. Cl.
*B63C 11/02* (2006.01)

(52) U.S. Cl.
CPC ....................................... *B63C 11/02* (2013.01)

(58) Field of Classification Search
USPC .................. 224/181, 901.2, 222, 660, 240
See application file for complete search history.

(56) References Cited

U.S. PATENT DOCUMENTS

| | | | |
|---|---|---|---|
| 2,270,931 A * | 1/1942 | Corcoran | 359/409 |
| 3,249,271 A * | 5/1966 | Allbritton | 224/181 |
| 4,188,658 A | 2/1980 | Aron | |
| 4,214,688 A * | 7/1980 | Griffin, Jr. | 224/197 |
| 4,360,930 A * | 11/1982 | Blanchard | 362/105 |
| 4,703,879 A * | 11/1987 | Kastendieck et al. | 2/422 |
| 4,718,126 A * | 1/1988 | Slay | 362/105 |
| 4,729,499 A * | 3/1988 | Martin | 224/181 |
| 4,797,793 A | 1/1989 | Fields | |
| 4,887,194 A | 12/1989 | Fields | |
| 4,970,631 A * | 11/1990 | Marshall | 362/105 |
| 4,998,187 A | 3/1991 | Herrick | |
| 5,102,024 A | 4/1992 | Boersma et al. | |
| 5,183,326 A | 2/1993 | Case | |
| 5,386,592 A * | 2/1995 | Checkeroski | 2/209.13 |
| 5,412,545 A | 5/1995 | Rising | |
| 5,567,039 A | 10/1996 | Sims | |
| 5,572,749 A * | 11/1996 | Ogden | 2/421 |
| 5,752,633 A | 5/1998 | Antaki | |
| 5,893,496 A | 4/1999 | Katz et al. | |
| 6,457,838 B1 | 10/2002 | Dugmore et al. | |
| 7,032,597 B1 * | 4/2006 | Frank | 128/846 |
| 7,520,629 B2 | 4/2009 | Johnson et al. | |
| 7,636,954 B2 | 12/2009 | Lang-Ree et al. | |
| 7,770,239 B1 * | 8/2010 | Goldman et al. | 2/416 |
| 8,079,501 B2 | 12/2011 | Woodman | |
| 8,875,318 B2 * | 11/2014 | Huh | 2/421 |
| 2003/0076676 A1 | 4/2003 | Gordon et al. | |
| 2003/0115662 A1 * | 6/2003 | Dobbie et al. | 2/422 |
| 2005/0111097 A1 * | 5/2005 | Iannarelli et al. | 359/409 |
| 2007/0131227 A1 | 6/2007 | Wheelwright | |
| 2013/0004153 A1 * | 1/2013 | Mckee et al. | 396/420 |
| 2013/0306689 A1 * | 11/2013 | Johnson | 224/181 |

* cited by examiner

*Primary Examiner* — Brian D Nash
(74) *Attorney, Agent, or Firm* — Carlos Candeloro

(57) ABSTRACT

A framework assembly for mounting accessories to the head of an underwater diver is disclosed. The assembly generally includes an equipment mounting rig connected by a post to a low-profile head-engaging base, wherein the base is adapted to fit snugly to the top part of a diver's head and under a diving hood such that the base is securely held in place by said diving hood. Waterproof equipment, including flashlights, cameras, and the like, may be mounted onto the rig.

13 Claims, 5 Drawing Sheets

AQUATIC EQUIPMENT-MOUNTING HEADGEAR

BACKGROUND OF THE INVENTION

The underwater environment encountered by divers presents many challenges for which products have been developed, including the lack of breathable air, the cold water temperature, and the inability of the human eye to properly focus when in contact with water.

Everyday equipment has also been developed such that it will work in an underwater environment, including, for example, flashlights, cameras, microphones, and the like. It has previously been recognized that hands-free equipment can be advantageous, both in a terrestrial environment and in an underwater environment. However hands-free underwater equipment must address constraints imposed by the increased density, viscosity, drag, and the like, offered by an underwater medium.

Accordingly, there is a need for diving hardware that permits the hands-free use of underwater equipment.

SUMMARY OF THE INVENTION

In one embodiment, a framework assembly for mounting accessories to the head of an underwater diver is disclosed. The assembly generally includes an equipment mounting rig connected by a post to a low-profile head-engaging base, wherein the base is adapted to fit snugly to the top part of a diver's head and under a diving hood such that the base is securely held in place by said diving hood.

DETAILED DESCRIPTION

Figure 1:
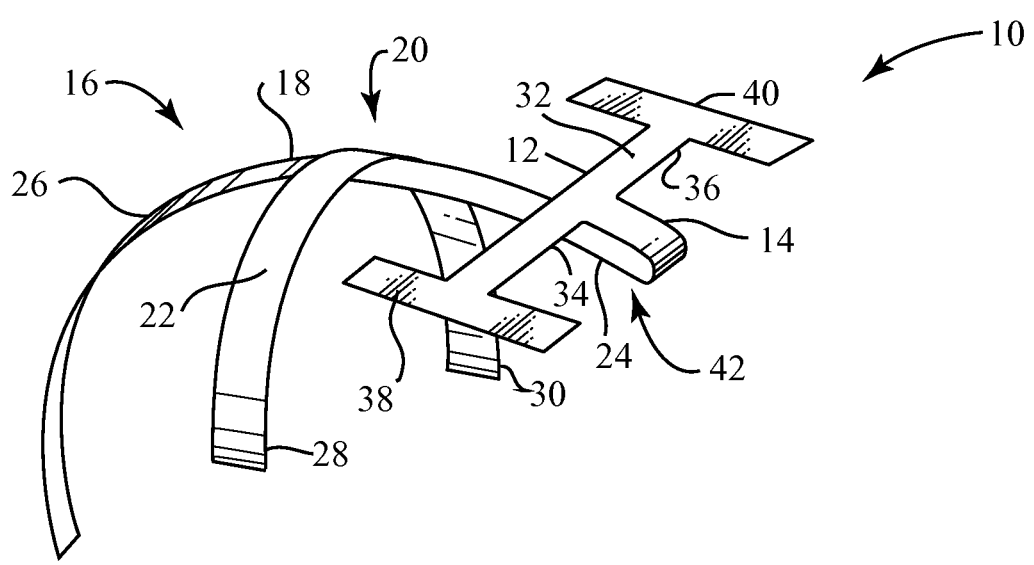
FIG. 1 is a perspective view of a framework assembly for mounting accessories to the head of an underwater diver in accordance with an embodiment of the invention.
Figure 2:
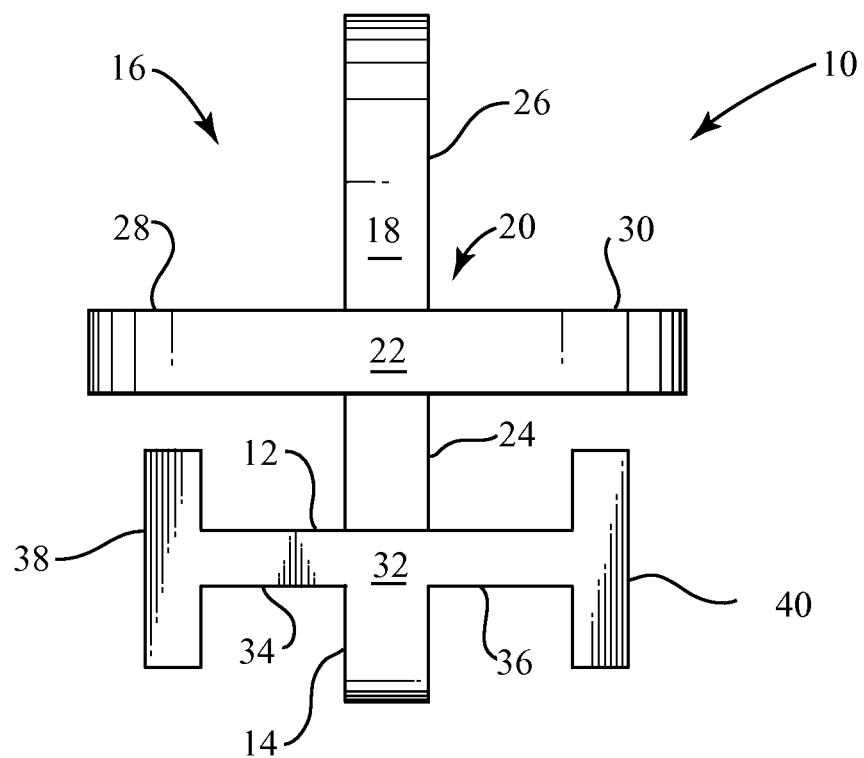
FIG. 2 is a top view of the framework assembly shown in FIG. 1.
Figure 3:
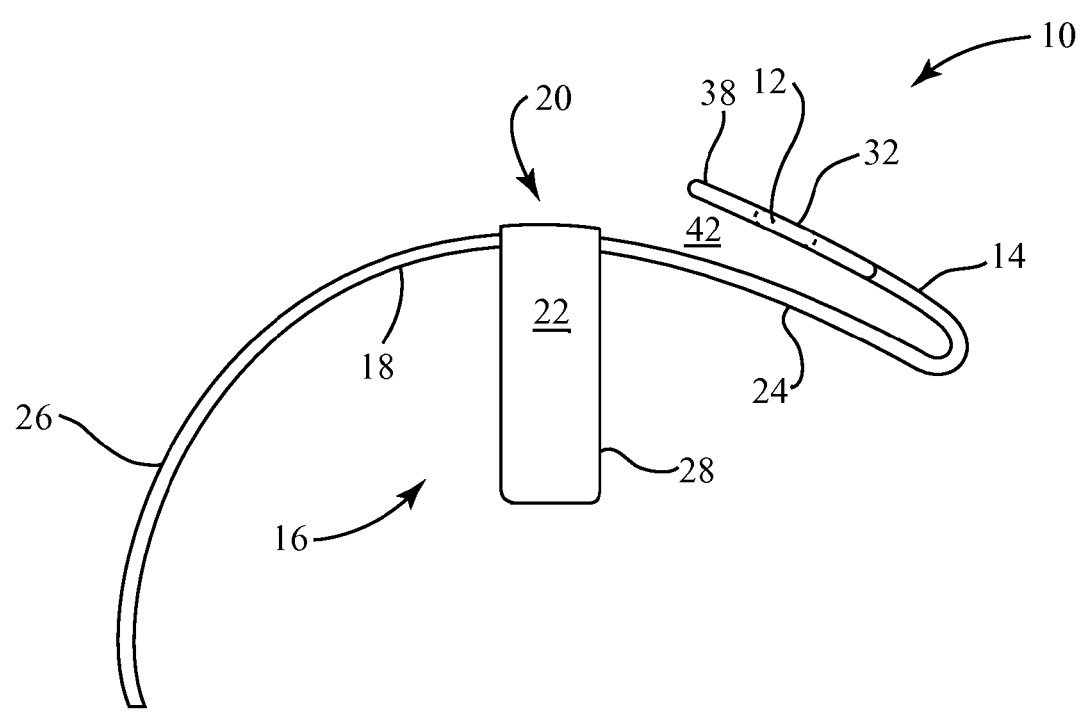
FIG. 3 is a lateral view the framework assembly shown in FIG. 1.
Figure 4:
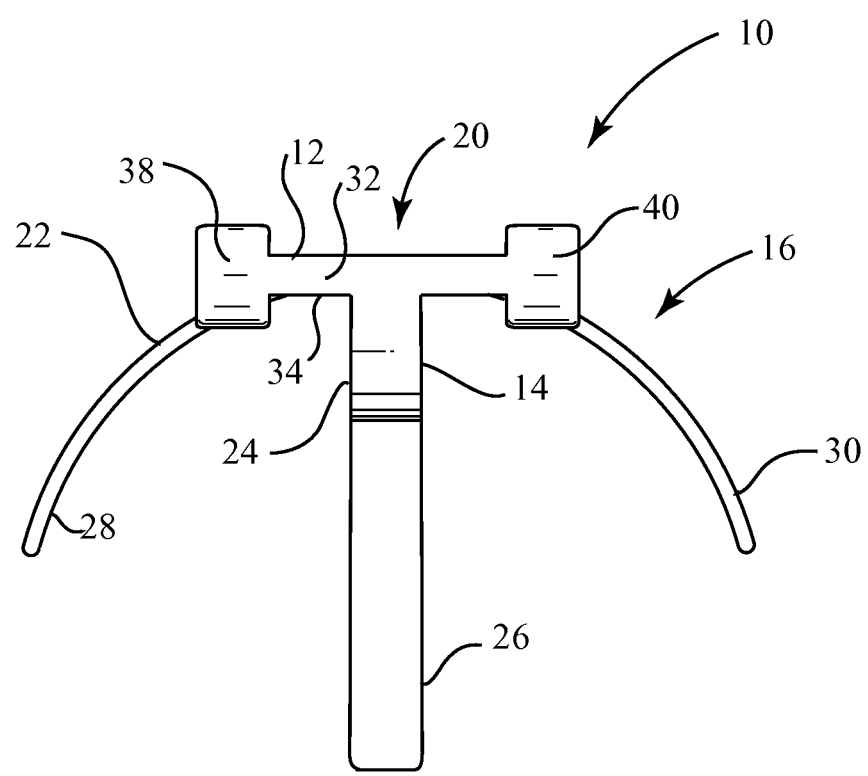
FIG. 4 is a front view of the framework assembly shown in FIG. 1.
Figure 5:
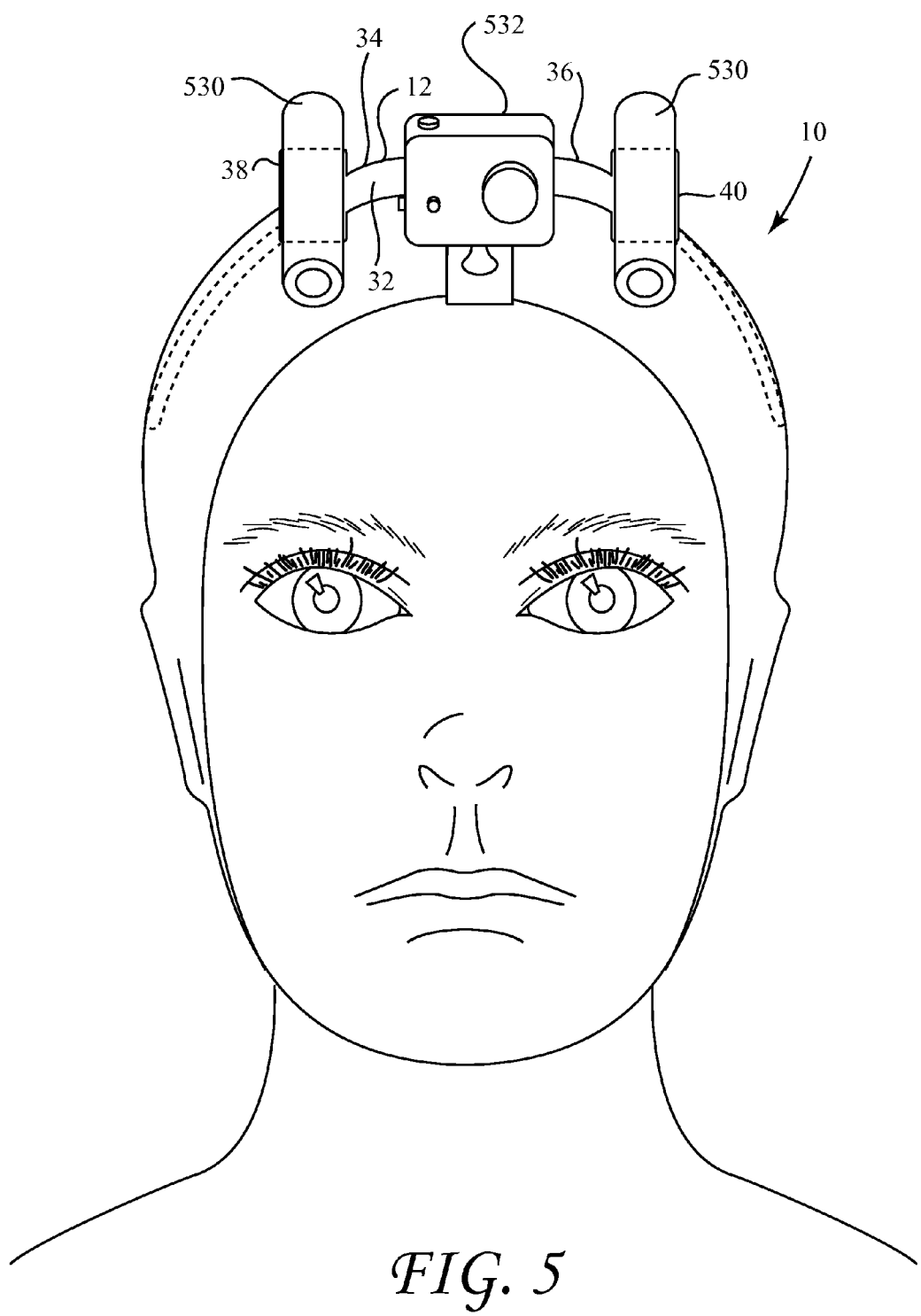
FIG. 5 is an illustration of the framework assembly in use, in accordance with an embodiment of the invention.

FIGS. 1-4 are perspective, top, lateral, and front view drawings, respectively, depicting an illustrative framework assembly 10 for mounting accessories to the head of an underwater diver as illustrated in FIG. 5, in accordance with an embodiment of the invention. The assembly 10 includes an equipment mounting rig 12 connected by a post 14 to a low-profile head-engaging base 16.

The base 16 of the assembly 10 may generally be formed or constructed in any effective manner. The base 16 is generally constructed as a low-profile head engaging structure adapted to fit snugly to the top part of a person's head and under a diving hood while being securely held in place by said diving hood, as illustrated in FIG. 5. In one embodiment, the base 16 includes an arched, cross-shaped head-engaging structure 16 having a front-to-back ridge 18 joined at a cross-junction 20 to a traverse, side-to-side cross-arm 22, thus defining anterior 24 and posterior 26 portions of said ridge 18 and right 28 and left 30 arms about said cross-junction 20. Unless otherwise required by the context, directional terms, including, for example, "top," "forward," "rearward," "right," and "left," as used herein refer to the orientation of the assembly 10 when worn on the head of an individual standing upright, looking ahead.

The equipment mounting rig 12 may generally be formed or constructed in any effective manner. The equipment mounting rig 12 generally includes one or more surfaces onto which equipment may be mounted. In one embodiment, the equipment mounting rig 12 includes a bar 32, or the like, affixed to a post 14 that connects the equipment mounting rig 12 to the base 16. In other embodiments, the equipment mounting rig 12 is joined or attached to the post 14 with an adjustable swivel joint, an adjustable hinge joint, or the like.

The bar 32 may have any effective shape and dimensions. In one embodiment, the bar 32 is a generally long, broad strip. The strip may have beveled front and back edges. For example, the bar 32 may be about half an inch wide, ⅛ inch thick and about 7 inches long. In one embodiment, the bar 32 is attached at its middle point to the post 14, thus forming symmetrical right 34 and left 36 wings. The wings 34, 36 may be curved to follow the contour of the head, decreasing the profile of the assembly 10 when in use. In one embodiment, the rig 12 further includes right 38 and left 40 flanges at the extremities of the right 34 and left 36 wings of the rig 12, each flange 38, 40 advantageously providing an increased attachment surface along the longitudinal axis of the rig 12. The flanges 38, 40 may be formed in any effective manner. For example, the flanges 38, 40 may be formed as part of the bar 32, welded onto the bar 32, joined or attached to bar 32 with an adjustable swivel joint, an adjustable hinge joint, or the like.

The equipment mounting rig 12 may be supported by the base 16 in any effective manner. In one embodiment, a post 14 extends up and back from the anterior portion 24 of the base 16, functionally connecting the base 16 to the equipment mounting rig 12. The post 14 may generally be formed or constructed in any effective manner. The post 14 is generally angled or tilted back from its attachment point on the base 16 such that the weight of equipment mounted onto the rig 12 is distributed closer to the center of the base 16 in the fore-aft direction (longitudinal axis), providing fore-aft balance to the assembly 10 when in use. A recess 42 is generally formed between the base 16 and the post 14. The diver's hood is generally received by said recess 42 when the assembly is mounted on a diver's head, as shown in FIG. 5.

The post 14 may generally be attached or connected to the base 16 in any effective manner. In one embodiment, the post 14 is a continuation of the ridge 18, which ridge 18 is bent backwards to form the post 14, while the equipment mounting rig 12 is welded onto the otherwise free end of the post 14. In other embodiments the post 14 is attached to the anterior portion 24 of the ridge 18 with a weld, an adjustable swivel joint, an adjustable hinge joint, or the like.

The dimensions of the elements forming the head-engaging base 16 can be important for stability, comfort, and overall performance of the assembly 10 when in use. For example, if a base 16 is constructed out of ⅛" aluminum, it has been found that for an average male head, a width of about 1 inch is generally effective for the ridge 18 and cross-arms 22. The anterior portion 24 of the ridge 18 should generally have a length such that it will extend from the forehead—where the face opening of the hood is—to about the coronal suture of the skull at the top of the head, or about 4.5 inches. The right 28 and left 30 arms of the cross-arm 22 should generally reach down from the ridge 18 to about the squamous suture of the skull, around, or slightly above the top of the ears, or about 6 inches each. The posterior portion 26 of the ridge 18 should generally extend to about the lambdoid suture of the skull, or about 5.5 inches. The ridge 18 and cross-arm 22 should generally have a curvature that substantially matches the curvature of the portion of the skull over which they are intended to sit atop. The dimensions should be appropriately scaled for different user demographics, including women, children, and those of above or below average skull size, such as to achieve the desired comfort and performance.

The assembly 10 of the present invention may generally be constructed in any effective manner and of any effective material or set of materials, including, for example, plastics, metal, rubber-covered metal, and the like. The assembly 10 should generally be sufficiently rigid to securely remain in place and prevent wobbling of the equipment when in use underwater. The assembly 10 should also generally be sufficiently sturdy to support normal impacts that may occur during diving or storage. The assembly may also advantageously be somewhat flexible or malleable. For example, the base 16 of the assembly may be flexible (for example, flexible plastic, or the like) such as to conform to the contour of a user's head under the forces applied by the hood. The base 16 may alternatively be rigid yet malleable (for example, aluminum, or the like) such that it may be bent by the user to comfortably conform to the contour of a user's head. Similarly, the post 14, the equipment mounting wings 20, 22, the flanges 38, 40, and other elements may advantageously be sufficiently rigid yet malleable such that the angle of the post 14, the position of the wings 20, 22 and flanges 38, 40 may be modified or adjusted to accept equipment of different sizes and/or forms, or to fine tune the relative position of the equipment.

In one embodiment, the assembly 10 is made by welding and bending 1 inch by ⅛ inch aluminum strips. In particular, a single strip of about 15 inches length is bent to form the post 14 and the ridge 18 portions of the assembly 10. The cross-arm 22 is then bent and welded at the cross-junction 20 to the ridge 18. The flanges 38, 40 are then welded to the equipment mounting bar 32 and the equipment mounting bar 32 is then welded to the post 14.

Any effective form of equipment may be mounted to the assembly 10. For example, water proof flashlights, water proof cameras, and the like. In one embodiment, shown in FIG. 5, the assembly 10 advantageously permits the secure, balanced, comfortable, hydrodynamic mounting of two powerful flashlights 530 (a principal and an auxiliary flashlight), one to each flange 38, 40 of the equipment mounting bar, and a water-proof camera 532 to the center of the rig 12.

Equipment may be affixed to the assembly 10 in any effective manner, including removably or permanently. For example, rubber bands, ratchet-type cable tie straps, vises, and/or the like, may be used.

In use, a diver will generally attach equipment (e.g., underwater flashlights) to the equipment mounting rig 12 of the present invention. The diver will generally put on a wetsuit, including a hood. Diver will pull mask over the head and bring it down to an "around the neck" position. Diver will then generally pull back hood such that top part of the head is exposed through face opening in the hood, then place base 16 of assembly 10 of the present invention on head, and then pull hood over the base 16 of the assembly 10 such that assembly 10 is firmly held in place by the hood, as may be seen illustrated in FIG. 5. Diver may then raise mask from around the neck onto its place covering the eyes and proceed to dive.

While embodiments and applications of this invention have been shown and described, it would be apparent to those skilled in the art that many more modifications are possible without departing from the inventive concepts herein. The invention, therefore, is not to be restricted except in the spirit of the appended claims.

The invention claimed is:

1. A framework assembly for mounting accessories to the head of an underwater diver, the assembly comprising: an equipment mounting rig connected by a post to a low-profile head-engaging base, said base and said post forming a recess for receiving a diving hood; the base comprising an arched, cross-shaped head-engaging structure comprising a front-to-back ridge joined at a cross-junction to a traverse, side-to-side cross-arm, thus defining anterior and posterior portions of said ridge and right and left arms about said cross-junction; wherein the post is formed as a continuation of the anterior portion of the ridge, which ridge is bent backwards to form said post such that the post has an extremity proximal to the ridge and an extremity distal from the ridge; wherein the base is adapted to fit snugly to the top part of a diver's head and under a diving hood such that the base is securely held in place by said diving hood.

2. The framework assembly of claim 1, the equipment mounting rig comprising a bar.

3. The framework assembly of claim 2, wherein the bar is attached at the bar's middle point to the post, thus forming symmetrical right and left wings of said bar, wherein said right and left wings are curved such as to follow the contour of a diver's head.

4. The framework assembly of claim 3, the bar comprising a strip about half an inch wide, about ⅛ inch thick and about 7 inches long.

5. The framework assembly of claim 3, the rig further comprising a flange at the extremity of a wing of the bar.

6. The framework assembly of claim 3, the rig further comprising a right flange on the right wing of the bar and a left flange on the left wing of the bar.

7. The framework assembly of claim 6, wherein the flanges are joined to their respective wings with an adjustable swivel joint or adjustable hinge joint.

8. The framework assembly of claim 1, wherein the equipment mounting rig is affixed to the post with an adjustable swivel joint or adjustable hinge joint.

9. The framework assembly of claim 1, wherein the equipment mounting rig is welded onto the distal extremity of the post.

10. The framework assembly of claim 1, wherein the post is attached to the anterior portion of the ridge with an adjustable swivel joint or adjustable hinge joint.

11. A framework assembly for mounting accessories to the head of an underwater diver, the assembly comprising: a low-profile head-engaging base comprising an arched, cross-shaped head-engaging structure comprising a front-to-back ridge joined at a cross-junction to a traverse, side-to-side cross-arm, thus defining anterior and posterior portions of said ridge and right and left arms about said cross-junction, wherein the base is adapted to fit snugly to the top part of a diver's head and under a diving hood such that the base is securely held in place by said diving hood; a post, wherein the post is formed as a continuation of the ridge, which anterior portion of said ridge is bent backwards to form said post, such that the post has an extremity proximal to the ridge and a extremity distal from the ridge; an equipment mounting rig comprising a bar welded at the bar's middle point to the distal extremity of the post, thus forming symmetrical right and left wings of said bar, wherein the right and left wings have distal ends away from said bar's middle point and the right and left wings are curved such as to follow the contour of a diver's head, the rig further comprising a right flange at the distal end of the right wing of the bar and a left flange at the distal end of the left wing of the bar.

12. The framework assembly of claim 11, the bar comprising a strip about half an inch wide, about 1/8 inch thick and about 7 inches long.

13. A framework assembly for mounting accessories to the head of an underwater diver, the assembly comprising: an equipment mounting rig connected by a post to a low-profile head-engaging base, the base comprising an arched, cross-shaped head-engaging structure comprising a front-to-back ridge joined at a cross-junction to a traverse, side-to-side cross-arm; wherein the base is adapted to fit snugly to the top part of a diver's head and under a diving hood such that the base is securely held in place by said diving hood; wherein the post extends from the base at an angle such that weight of accessories mounted onto the rig is distributed closer to the center of the base in the fore-aft direction.

* * * * *